(12) United States Patent
Merlo et al.

(10) Patent No.: US 7,943,267 B2
(45) Date of Patent: May 17, 2011

(54) ASSEMBLIES FOR ELECTROCHEMICAL DEVICES

(75) Inventors: Luca Merlo, Como (IT); Alessandro Ghielmi, Milan (IT); Vincenzo Arcella, Milan (IT)

(73) Assignee: Solvay Solexis S.P.A., Milan (IT)

( * ) Notice: Subject to any disclaimer, the term of this patent is extended or adjusted under 35 U.S.C. 154(b) by 1155 days.

(21) Appl. No.: 11/645,539

(22) Filed: Dec. 27, 2006

(65) Prior Publication Data
US 2007/0148517 A1  Jun. 28, 2007

(30) Foreign Application Priority Data
Dec. 28, 2005  (IT) ................... MI05A2509

(51) Int. Cl.
*H01M 8/02* (2006.01)
*H01M 8/10* (2006.01)
*H01M 4/94* (2006.01)

(52) U.S. Cl. ........ 429/480; 429/493; 429/508; 429/530; 429/535

(58) Field of Classification Search .................. 429/480, 429/481, 483, 493, 494, 530, 534, 535, 508
See application file for complete search history.

(56) References Cited

U.S. PATENT DOCUMENTS

| | | | |
|---|---|---|---|
| 2,242,218 A | 5/1941 | Auer | |
| 3,282,875 A | 11/1966 | Conolly et al. | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,035,565 A | 7/1977 | Apotheker et al. | |
| 4,243,770 A | 1/1981 | Tatemoto et al. | |
| 4,433,082 A | 2/1984 | Grot | |
| 4,564,662 A | 1/1986 | Albin | |
| 4,610,762 A | 9/1986 | Birdwell | |
| 4,666,648 A | 5/1987 | Brittain | |
| 4,694,045 A | 9/1987 | Moore | |
| 4,745,165 A | 5/1988 | Arcella et al. | |
| 4,943,622 A | 7/1990 | Naraki et al. | |
| 5,173,553 A | 12/1992 | Albano et al. | |
| 6,555,639 B2 | 4/2003 | Apostolo et al. | |
| 6,576,100 B2 * | 6/2003 | Arcella et al. | 429/494 X |
| 6,592,934 B2 * | 7/2003 | Totsuka | 429/534 X |
| 6,639,011 B2 | 10/2003 | Arcella et al. | |
| 6,716,549 B2 * | 4/2004 | Bai et al. | 429/480 |
| 6,815,114 B1 * | 11/2004 | Bronold et al. | 429/483 |
| 7,226,685 B2 * | 6/2007 | Kuroki et al. | 429/534 X |

(Continued)

FOREIGN PATENT DOCUMENTS
EP   1 136 596 A2   4/1985
(Continued)

OTHER PUBLICATIONS

Yoshida et al., "Characterization of Flemion® membranes for PEFC", Electrochimica Acta 43(24), 1998, pp. 3749-3754.
(Continued)

Primary Examiner — Stephen J. Kalafut
(74) Attorney, Agent, or Firm — Arent Fox LLP

(57) ABSTRACT

Assemblies or MEA devices (Membrane Electrode Assembly) comprising a membrane and two electrocatalytic layers on each side thereof, wherein:
- the area of each of the two electrocatalytic layers is lower than that of the membrane;
- on each of the two sides of the ionomeric membrane there is at least one subgasket, applied on the MEA non catalyzed area;
- the edges of the ionomeric membranes being enclosed among said subgaskets.

29 Claims, 6 Drawing Sheets

U.S. PATENT DOCUMENTS 7,396,610 B2 * 7/2008 Barnett et al. ............ 429/483 X

FOREIGN PATENT DOCUMENTS

| EP | 0 148 482 A2 | 7/1985 |
|---|---|---|
| EP | 0 199 138 A2 | 10/1986 |
| EP | 0 239 123 A2 | 9/1987 |
| EP | 0 410 351 A1 | 1/1991 |
| EP | 0 661 304 B1 | 7/1995 |
| EP | 1 004 615 B1 | 5/2000 |
| EP | 1 239 000 A1 | 9/2002 |
| EP | EP 1 511 103 | 3/2005 |
| EP | 1 589 062 A2 | 10/2005 |
| WO | WO 97/40924 | 11/1997 |
| WO | WO 99/19929 | 4/1999 |
| WO | WO 2005/041332 | 5/2005 |

OTHER PUBLICATIONS

Pozio et al., "*Nafion degradation in PEFCs from end plate iron contamination*", Electrochimica Acta, 48, 2003, pp. 1543-1549.

* cited by examiner

ASSEMBLIES FOR ELECTROCHEMICAL DEVICES

BACKGROUND OF THE INVENTION

The present invention relates to eletrode membrane assemblies to be used in electrochemical devices, in particular in PEM fuel cells (polymeric electrolyte fuel cells), and their process.

As known, the PEM fuel cells comprise a core comprising an ionomeric membrane having on each side an electrode containing the catalyst for the combustion reaction, on each side of the membrane at least one gas diffusion layer is first placed, followed by a bipolar plate. Two sections wherein the comburent and the fuel are respectively fed, the sections being located between the ionomeric membrane and each of the two bipolar plates The comburent is generally air or pure oxygen; the fuel is for example pure hydrogen, gaseous mixtures containing hydrogen, or methanol or ethanol aqueous solutions. The two sections form a reaction cell. The key feature of a fuel cell is the Membrane Electrode Assembly or MEA placed, as said, between the bipolar plates of the reaction cell. The simplest membrane electrode assembly is formed of an ionomeric membrane, acting as electrolyte, with an electrocatalytic layer (catalyzed area) applied on both sides of the membrane. These assemblies in the prior art are known as Catalyst Coated Membrane (CCM) or 3-layer MEA.

As said, MEAs are used in electrochemical devices with at least one gas diffusion layer in contact with each electrocatalytic layer.

Other types of assemblies or MEA devices with a higher number of layers are known in the prior art. For example, the 5-layer MEA is an assembly wherein, on each of the two electrocatalytic layers of a 3-layer MEA as defined above, a gas microdiffusion layer is applied. The latter has hydrophobic characteristics, generally is a mixture of carbon powder and PTFE. The 7-layer MEA is an assembly wherein on each of the two microdiffusion layers of the 5-layer MEA a gas macrodiffusion layer is applied. The latter has hydrophobic characteristics, generally formed of PTFE-treated carbon fibers or tissues.

The single reaction cells are assembled in electrical series thus obtaining a device called fuel cell stack. The fuel cell stacks supply powers, generally between some tenths of watt and some hundreds of Kilowatt and generates heat. A cooling system is therefore necessary to remove the heat produced by the electrochemical reaction. In the stacks it is a common practice to alternate the single reaction cells with cooling cells fed with a fluid, generally demineralized water.

In the MEAs the portion of the ionomeric membrane surface coated by the electrocatalytic layer, represents a fraction generally between 40 and 90% of the total membrane surface. This surface fraction is indicated as "active area" as it is involved in the electrochemical reaction. On the remaining part of the membrane surface, i.e. on the non active area, a protective film can be applied, generally formed of an inert material towards the reaction taking place in the electrochemical device. The protective film is generally known as "subgasket" and has the purpose to improve the MEA handling, for example to facilitate the assembling in electrochemical devices and to protect the polymeric electrolyte from the contact with the bipolar plates. The obtained device is called MEA with subgasket. A 3-layer MEA with subgasket according to the prior art is illustrated in FIG. 1 in a plan view. (1') indicates the central area (in dark) which represents the active area as above, (2') is the membrane surface coated by the subgasket. (6') indicates the three openings, respectively, in the upper- and in the lower-part of the MEA. When the latter is assembled in a stack, the openings form 6 distribution channels, which in couples are used, respectively, for the comburent and fuel transport and for the cooling fluid.

FIG. 2 reports a MEA sectional view along B-B of FIG. 1 (4') represents the ionomeric membrane, the two layers (3'), positioned symmetrically with respect to the membrane, indicate the subgaskets, the two layers (5') correspond to the catalytic layers, which coat the membrane in correspondence with the active area.

FIG. 3 reports a MEA sectional view along A-A of FIG. 1, wherein (4') represents the ionomeric membrane, the two layers (3'), positioned symmetrically with respect to the membrane, correspond to the subgaskets. FIGS. 2 and 3 show that the subgaskets cover the non active portion of each side of the membrane. In the prior art, these electrochemical devices maintain a high efficiency for long time by using cooling fluids having a high purity degree, in order for avoiding pollution sources. Generally, when possible, in the prior art as cooling fluid, deionized water is used. Deionized water, of the quality required for the working of polymeric membrane electrochemical devices, has to be produced by a plant for the purification of water. In fact the cooling fluid amount required for the working of a fuel cell stack is quite large. Therefore, from an industrial point of view, the use of high purity cooling fluids in electrochemical devices represents an additional cost for the plant and its maintenance.

The need was felt to have available MEA assemblies with subgasket, having the following combination of properties:
  possibility to use cooling fluids, for example water, having lower purity than that required by the prior art, and thus cheaper from an industrial point of view;
  ability to use also cooling fluids formed of mixtures of water with high boiling solvents, for example, water/glycols, for use at temperatures higher than 100° C., for example up to 160° C., and use at temperatures lower than 0° C., for example down to −40° C.;
  durable adhesion of the subgasket to the MEA.

SUMMARY OF THE INVENTION

The Applicant has found MEA assemblies solving the above technical problem.

An object of the present invention is an assembly or MEA device (Membrane Electrode Assembly) comprising a membrane and, on each side, two electrocatalytic layers wherein:
  the area of each of the two electrocatalytic layers is lower than that of the membrane;
  on each of the two sides of the ionomeric membrane there is at least one subgasket;
the edges of the ionomeric membranes being enclosed among said subgaskets, each subgasket being positioned on the non active area of the MEA.

Therefore, the edges of the ionomeric membrane of the present invention are enclosed among the subgaskets and isolated both from the external environment and from the reaction and cooling fluids.

According to the present invention ionomeric membrane edges mean the membrane external edge and the edges of the openings made in the membrane for the comburent, fuel and cooling fluid transport.

The subgasket is applied in the non catalyzed area of the MEA, i.e. in the membrane area not coated by the catalyst. However, if desired, the subgaskets could also coat a portion of the area comprising the electrocatalytic layer.

Two or more subgaskets can be present on one or both sides of the membrane.

The MEA devices with subgaskets can be in form of 3-layer, 5-layer or 7-layer.

BRIEF DESCRIPTION OF THE DRAWINGS

FIG. 7-1 is a front view of a subgasket sheet according to an aspect of the present invention;

FIG. 7-2 is a front view of a membrane side according to an aspect of the present invention;

FIG. 7-3 is a front view of an assembly on the membrane side with the subgasket of FIG. 7-2;

FIG. 7-4 is a plan view of the assembly of FIG. 7-3 with a second subgasket of FIG. 7-1 applied;

FIG. 7-5 is a plan view of the assembly of FIG. 7-4 with a gas diffusion electrode;

FIG. 7-6 is a plan view of the assembly of FIG. 7-5 according to an aspect of the present invention;

FIG. 8-1 is a front view of a subgasket sheet according to an aspect of the present invention;

FIG. 8-2 is a front view of a membrane side according to an aspect of the present invention;

FIG. 8-3 is a front view of an assembly on the membrane side with the subgasket of FIG. 8-2;

FIG. 8-4 is a plan view of the assembly of FIG. 8-3 with a second subgasket of FIG. 8-1 applied;

FIG. 8-5 is a plan view of the assembly of FIG. 8-4 with a gas diffusion electrode;

FIG. 8-6 is a plan view of the assembly of FIG. 8-5 according to an aspect of the present invention;

FIG. 9-1 is a front view of a subgasket sheet according to an aspect of the present invention;

FIG. 9-2 is a front view of a membrane side according to an aspect of the present invention;

FIG. 9-3 is a plan view of the assembly of FIG. 9-2;

FIG. 9-4 is a plan view of the assembly of FIG. 9-3; and

FIG. 4 is a plan view of a 3-layer MEA device according to the present invention. The central area (1) represents the MEA active area. (2) represents the membrane surface coated with the subgasket. (1) together with (2) corresponds to the area of the ionomeric membrane. (3) represents the parts of the subgasket in mutual contact and which are not in contact with the membrane surface. (2) together with (3) corresponds to the subgasket area. (11) indicates the openings in the MEA for the comburent, fuel and cooling fluid transport, for example the three upper openings represent the inlet of the above fluids, the lower openings the outlet of the above fluids.

FIG. 5 is the section D-D of FIG. 4. (4) represents the ionomeric membrane; (2) corresponds to the subgasket area coating the membrane and corresponds to (2) of FIG. 4; (3) corresponds to the overlapping area between the two subgaskets and corresponds to (3) of FIG. 4. The two layers (5) represent the catalytic layers.

FIG. 6 is the section C-C of FIG. 4. The membrane is represented by (4). (2) represents the subgaskets coating the membrane; (3) corresponds to the overlapping area between the two subgaskets.

Figure 1:
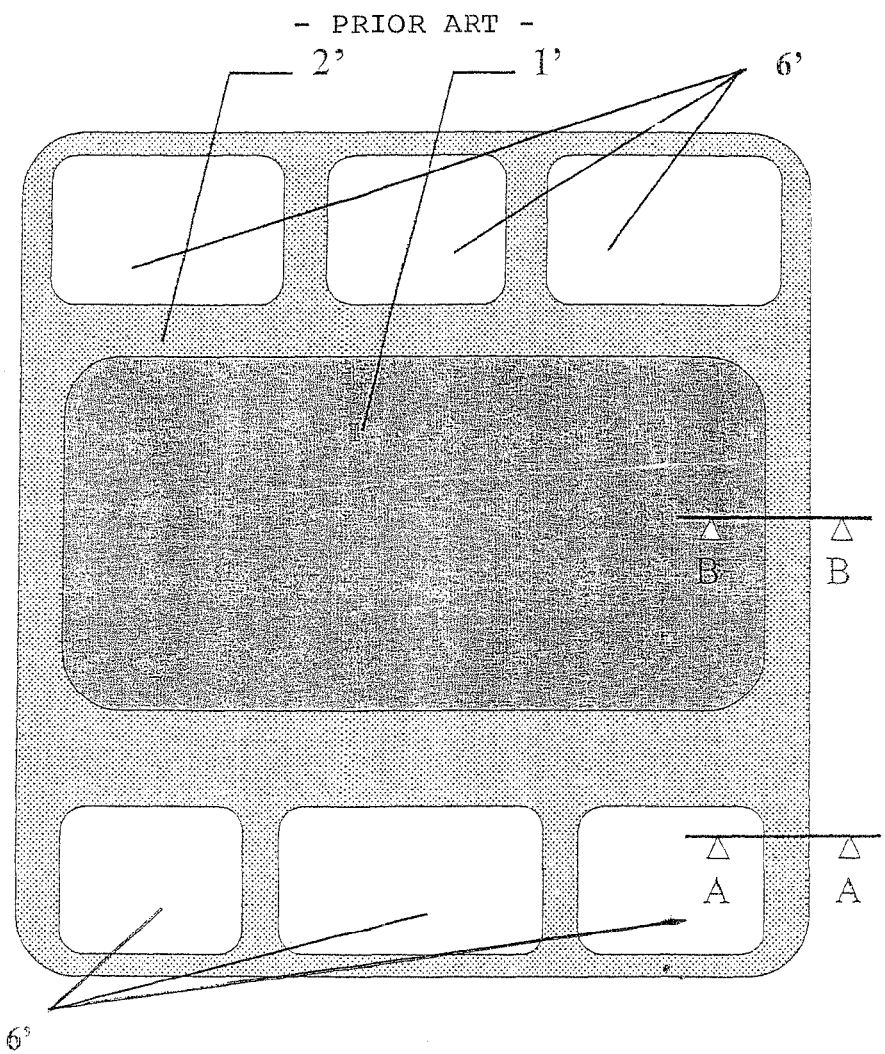
FIG. 1 is a plan view of a prior art MEA subgasket.

Therefore a 3-layer MEA according to the present invention comprises:

an active area (1), formed of the two electrocatalytic layers positioned on each side of the membrane, the area of the electrocatalytic layers is lower than that of the membrane; the ionomeric membrane and the electrocatalytic layers form the 3-layer MEA; the active area (1) is not coated by subgasket;

an area (2) (see FIGS. 5 and 6) representing the ionomeric membrane surface coated by the subgasket; (3) (see FIGS. 5 and 6) represent the overlapping of the subgaskets enclosing the membrane edges.

The 5-layer MEA is formed of a 3-layer MEA wherein on each side of the two electrocatalytic layers, not in contact with the membrane, a gas microdiffusion layer is applied. The latter has hydrophobic characteristics, generally it is formed of a mixture of carbon powder and PTFE.

The 7-layer MEA is formed of a 5-layer MEA wherein on each side of the two microdiffusion layers, not in contact with the electrocatalytic layer, a gas macrodiffusion layer is applied. The latter has hydrophobic characteristics, generally it is formed of PTFE-treated carbon fibers or tissues.

The membrane and the electrocatalytic layers of the MEA device are obtainable by using (per)fluorinated ionomers with sulphonic groups in —$SO_3H$ acid or salified form, having equivalent weight from 380 g/eq to 1,600 g/eq, preferably from 500 to 1,200 g/eq, still more preferably 750-950 g/eq. The preferred ionomers comprise the following units:

(A) monomeric units deriving from one or more fluorinated monomers containing at least one ethylenic unsaturation;

(B) fluorinated monomeric units containing —$SO_2F$ sulphonyl groups in amounts such that the ionomer has the equivalent weight in the above range.

Alternatively, as ionomers, homopolymers formed of monomeric units (B) can be used.

The ionomers containing the sulphonic groups in acid form —$SO_3H$ can be obtained by hydrolysis of the —$SO_2F$ groups, and optionally salification of the —$SO_3H$ groups.

The fluorinated monomers (A) are selected from the following:

vinylidene fluoride (VDF);

$C_2$-$C_6$ perfluoroolefins, preferably tetrafluoroethylene (TFE);

$C_2$-$C_6$ chloro- and/or bromo- and/or iodo-fluoroolefins such as chlorotrifluoroethylene (CTFE) and bromotrifluoroethylene;

$CF_2$=$CFOR_{fl}$ (per)fluoroalckylvinylethers (PAVE), wherein $R_{fl}$ is a $C_1$-$C_6$ (per)fluoroalkyl, for example trifluoromethyl, bromodifluoromethyl, pentafluoropropyl;

$CF_2$=CFOX perfluoro-oxyalkylvinylethers, wherein X is a $C_1$-$C_{12}$ perfluoro-oxyalkyl having one or more ether groups, for example perfluoro-2-propoxy-propyl;

fluorovinylethers (MOVE) of general formula $CFX_{AI}$=$CX_{AI}OCF_2OR_{AI}$ (A-I), wherein $R_{AI}$ is a linear, branched $C_1$-$C_6$ (per)fluoroalkyl group or $C_5$-$C_6$ cyclic, or a linear or branched when possible $C_1$-$C_6$ (per) fluorooxyalkyl group containing from one to three oxygen atoms; when $R_{AI}$ is fluoroalkyl or fluorooxyalkyl as above it can contain from 1 to 2 atoms, equal or different, selected from the following: H, Cl, Br, I; $X_{AI}$=F, H, preferably F; the preferred fluorovinylethers are:

(MOVE 1) $CF_2$=$CFOCF_2OCF_2CF_3$, (MOVE 2) $CF_2$=$CFOCF_2OCF_2CF_2OCF_3$, (MOVE 3) $CF_2$=$CFOCF_2OCF_3$.

The fluorinated monomers (B) are selected from one or more of the following:

$F_2C=CF-O-CF_2-CF_2-SO_2F$;

$F_2C=CF-O-[CF_2-CX_AF-O]_{nA}-(CF_2)_{nB}-SO_2F$ wherein $X_A=Cl$, F or $CF_3$; nA=1-10, nB=2, 3;

$F_2C=CF-O-(CF_2)_{nC}-SO_2F$; nC=3-10;

$F_2C=CF-Ar-SO_2F$ wherein Ar is an aromatic ring, the ring can be substituted in one or more free positions by aliphatic chains from 1 to 10 carbon atoms, optionally containing heteroatoms.

Other monomers (B'), which can be used alternatively to (B) for preparing the ionomers, are those having equivalent weight as reported for sulphonic ionomers, they are monomers (B') containing precursor groups which are transformed by hydrolysis into —COOH acid groups, and optionally in their corresponding salts, optionally monomers (B') are used in admixture with monomers (B).

Fluorinated monomers (B') used for preparing the ionomers containing —COOH acid groups have the following structures:

$F_2C=CF-O-CF_2-CF_2-Y$;

$F_2C=CF-O-[CF_2-CX_AF-O]_{nA}-(CF_2)_{nB}-Y$ wherein $X_A=Cl$, F or $CF_3$; nA=1-10, nB=2, 3;

$F_2C=CF-O-(CF_2)_{nC}-Y$; nC=3-10;

$F_2C=CF-Ar-Y$ wherein Ar is an aryl group;

wherein Y is a precursor group of the carboxylic group, selected from the following: CN, COF, COOH, $COOR_B$, $COO^-Me^+$, $CONR_{2B}R_{3B}$, wherein $R_B$ is $C_1$-$C_{10}$, preferably $C_1$-$C_3$ alkyl and $R_{2B}$ and $R_{3B}$, equal or different, are H or have the meaning of $R_B$, Me is an alkaline metal.

As said, the fluorinated monomers (B') having the above formulas can be in admixture with the fluorinated monomers containing —$SO_2F$ sulphonyl groups, the total amount of the monomers (B) and (B') being such that the equivalent weight of the ionomer is in the above range.

Optionally the sulphonic fluorinated ionomers of the invention can contain from 0.01% to 2% by moles of monomeric units deriving from a bis-olefin of formula:

$$R_1R_2C=CH-(CF_2)_m-CH=CR_5R_6 \quad (I)$$

wherein:

m=2-10, preferably 4-8;

$R_1$, $R_2$, $R_5$, $R_6$, equal to or different from each other, are H or $C_1$-$C_5$ alkyl groups.

Preferably the membranes and the electrocatalytic layers of the device of the present invention contain perfluorinated ionomers obtainable from ionomers comprising:

monomeric units deriving from TFE;

monomeric units deriving from $CF_2=CF-O-CF_2CF_2SO_2F$.

The hydrolysis of the precursors of the acid functional groups of the ionomers comprises two steps: the first is carried out in basic environment and the second in acid environment, obtaining the ionomers with functional groups in the acid form, —$SO_3H$ and/or —COOH. For example, in case of sulphonyl —$SO_2F$ precursor groups, they are transformed into sulphonic groups —$SO_3H$ by the following steps:

salification of the —$SO_2F$ form into the —$SO_3^-Me^+$ form, where Me is an alkaline metal;

acidification of the —$SO_3^-Me^+$ form into the —$SO_3H$ form.

The first step can for example be carried out by mixing the ionomeric polymer with an aqueous solution containing 10% by weight of KOH, at a temperature in the range 60° C.-80° C., for a time longer than 2 hours, until disappearance of the —$SO_2F$ groups (determined by IR analysis) and formation of the —$SO_3^-Me^+$ group. At the end of the salification step the ionomer is washed with water at a temperature preferably not higher than 25° C. The acidification step is carried out, for example, by transferring the salified ionomer in an aqueous solution containing 20% by weight of HCl at room temperature and by keeping under stirring for at least half an hour. At the end a washing is carried out with water according to the above procedures.

The ionomers used for preparing the membrane, when they are amorphous (per)fluorinated polymers, can be crosslinkable or crosslinked. When the membrane is formed of crosslinkable ionomers, crosslinking is carried out on the obtained membrane. To carry out the crosslinking, the ionomer is mixed with crosslinking agents. The sulphonic fluorinated ionomers are crosslinked, for example, by peroxidic way. In this case they must contain radical attack sites in the chain and/or in end position of the macromolecules, for example iodine and/or bromine atoms.

Preferably the crosslinkable fluorinated sulphonic ionomers comprise:

monomeric units deriving from TFE;

monomeric units deriving from $CF_2=CF-O-CF_2CF_2SO_2F$;

monomeric units deriving from the bis-olefin of formula (I);

iodine atoms in end position.

The introduction in the chain of said iodine and/or bromine atoms can be carried out by addition, in the reaction mixture, of brominated and/or iodinated "cure-site" comonomers as bromo- and/or iodo-olefins having from 2 to 10 carbon atoms, as described for example in U.S. Pat. Nos. 4,035,565 and 4,694,045, or iodo- and/or bromo-fluoro-alkylvinyl-ethers, as described in U.S. Pat. Nos. 4,745,165 , 4,564,662 and EP 199,138, in amounts such that the "cure-site" comonomer content in the final product is generally between 0.05 and 2 moles per 100 moles of the other monomeric units.

Alternatively, or also in combination with "cure-site" comonomers, the introduction of end iodine and/or bromine atoms can be carried out by addition to the reaction mixture of iodinated and/or brominated chain transfer agents as, for example, the compounds of formula $R_{fl}(I)_x(Br)_y$, wherein $R_{fl}$ is a (per)fluoroalkyl or a (per)fluorochloroalkyl having from 1 to 8 carbon atoms, while x and y are integers between 0 and 2, with $1 \leq x+y \leq 2$ (see for example U.S. Pat. Nos. 4,243,770 and 4,943,622). It is also possible to use as chain transfer agents iodides and/or bromides of alkaline or alkaline-earth metals, according to U.S. Pat. No. 5,173,553.

Preferably the crosslinking by radical mechanism uses ionomers containing units of the bis-olefin of formula (I) and iodine in end position.

The sulphonic ionomer is crosslinked by radical way at a temperature in the range 100° C.-200° C., depending on the type of peroxide used, by adding a peroxide capable to generate radicals by heating. Generally, the peroxide amount is between 0.1% and 5% by weight with respect to the polymer. Among the usable peroxides the following ones can be mentioned: dialkylperoxides as for example di-terbutyl-peroxide and 2,5-dimethyl-2,5-di(terbutylperoxy) hexane; dicumyl peroxide; dibenzoyl peroxide; diterbutyl perbenzoate; di-1,3-dimethyl-3-(terbutylperoxy)butylcarbonate. Other peroxidic systems are described, for example, in patents EP 136,596 and EP 410,351.

Furthermore, the following components can optionally be added to the ionomer mixture together with the crosslinking agents:

a crosslinking co-agent, in amounts between 0.5 and 10%, preferably between 1 and 7% by weight with respect to the polymer; among crosslinking co-agents it can be mentioned: triallyl-cyanurate; triallyl-isocyanurate (TAIC); tris(diallylamine)-s-triazine; triallylphosphite; N,N-diallyl-acrylamide;N,N,N',N'-tetraallyl-malonamide; trivinyl-isocyanurate; 2,4,6-trivinil-methyltrisiloxane; N,N'bisallylbicyclo-oct-7-ene-disuccinimide (BOSA); bis olefin of formula (I), triazines;

a metal compound, in amounts between 1% and 15%, preferably between 2% and 10% by weight with respect to the polymer, said metal compound selected from divalent metal oxides or hydroxides as, for example, Mg, Zn, Ca or Pb, optionally associated to a weak acid salt as, for example, stearates, benzoates, carbonates, oxalates or phosphites of Ba, Na, K, Pb, Ca;

conventional additives as thickeners, pigments, antioxidants, stabilizers and the like;

inorganic or polymeric reinforcing fillers, preferably PTFE optionally PTFE with fibrille structure. Preferably the fillers have particle size from 10 to 100 nm, preferably 10-60 nm.

The ionomer used can optionally be mixed with another fluoropolymer. For example crystalline fluoropolymers such as PTFE, optionally modified with a comonomer as HFP (hexafluoropropene), VE (vinylethers), for example MFA, PFA, FEP, optionally modified with VE; PVDF, ECTFE, ETFE, PCTFE, can be mentioned.

Fluoroelastomers, preferably perfluoroelastomers, co-curable with the ionomer, can also be used. Preferably, for co-curing the fluoroelastomer contains iodine and/or bromine atoms. The TFE/perfluoromethylvinylether copolymer having a ratio by moles between the two monomers in the range 80/20-60/40, can for example be mentioned. Said copolymer is for example described in EP 661,304 and is used in an amount between 0 and 50% by weight with respect to the ionomer.

The ionomer and fluoroelastomer mixture can for example be a physical blend of solid polymers or of polymerization latexes. In this case the peroxide percentages to be used are to be referred to the mixture formed of the ionomer and the fluoroelastomer. The percentages by weight of the optional agents which are added are referred to the weight of said mixture.

The crosslinking blend is prepared, for example, by using mechanical mixers.

When in the crosslinking phase iodine has been used, its residual traces can be removed from the membrane by thermal post-treatment, at temperatures preferably in the range 200° C.-250° C.

The membranes and the electrocatalytic layers of the MEA device of the present invention are prepared by using ionomers under the form of solutions and/or dispersions, prepared as described, for example, in EP 1,004,615 and U.S. Pat. No. 4,433,082. For example they can be prepared by casting on non porous supports as, for example, described in U.S. Pat. No. 4,666,648 and in U.S. Pat. No. 4,610,762. Alternatively, the membranes can be prepared by impregnation of porous inert supports as described, for example, in EP 1,239,000 or in patent application WO 97/40924. The membranes can be prepared also by extrusion and skjving, as described in EP 1,589,062.

The membranes and the MEA electrocatalytic layers generally have a thickness ranging from 3 micrometres to 100 micrometres. The membranes preferably have a thickness from 10 to 80 micrometres, more preferably from 15 to 60 micrometres; the electrocatalytic layers preferably have a thickness from 5 to 50 micrometres, more preferably from 5 to 30 micrometres.

The electrocatalytic layers comprise an ionomer and a catalyst. The latter is preferably Pt or a mixture of Pt with one or more metals as, for example, Ru, Rh, Mo. The catalyst is preferably finely dispersed in the carbon powder, still more preferably supported on it. Carbon powders known with the commercial names Vulcan XC-72, Ketjen Black, Black Pearls, Shawinigan Acetylene Black, etc. can for example be used.

The ionomer of the electrocatalytic layer has composition and/or equivalent weight equal to or different from the ionomer used in the membrane and/or in the other electrocatalytic layer. The preferred ionomers have been indicated above.

The ratio by weight between catalyst and ionomer in each of the two electrocatalytic layers generally ranges from 0.5 to 4, preferably between 0.5 and 2.5.

The ratio by weight between the metal forming the catalyst and the carbon powder support is preferably higher than or equal to 10. When as fuel hydrogen is used, said ratio is between 20 and 60, when methanol is used between 60 and 100.

The ratio mg of metal catalyst/$cm^2$ of electrocatalytic layer generally ranges from 0.01 to 2. When in the electrochemical cell hydrogen is used as fuel, the ratio (mg of metal catalyst)/($cm^2$ of electrocatalytic layer) preferably ranges from 0.01 to 0.7 mg/$cm^2$, preferably by using from the cathode side a ratio ranging from 0.1 to 0.7 mg/$cm^2$; when methanol is used as fuel, the ratio preferably ranges from 0.3 to 1 mg/$cm^2$ from the anode side and from 0.5 to 2 mg/$cm^2$ from the cathode side.

The two microdiffusion layers usable in the 5-layer MEA device and the two macrodiffusion layers usable in the 7-layer MEA assembly are those available on the market. SIGRACET (SGL-Germany) can, as an example, be mentioned. Similar products are marketed by the company E-TEK (USA).

In case of the 7-layer MEA device, the diffusion layers with applied the electrocatalytic layer are available on the market, commercialized by the above company E-TEK.

The subgaskets can be thermoplastics or elastomeric polymers, hydrogenated or fluorinated. As thermoplatic polymers, polyethylenterephthalate (PET), polyamides, tetrafluoroethylene/hexafluoropropene (FEP) copolymers can be mentioned; as elastomers EPDM, Viton® fluoroelastomer, silicone rubbers can for example be mentioned.

Figure 3:
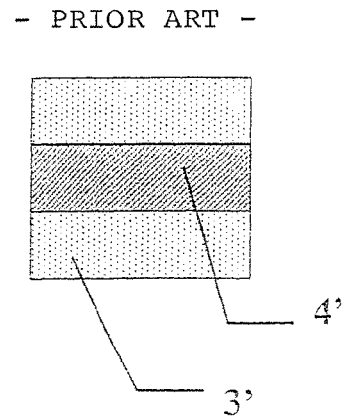
FIG. 3 is a sectional view taken along A-A of FIG. 1.
Figure 4:
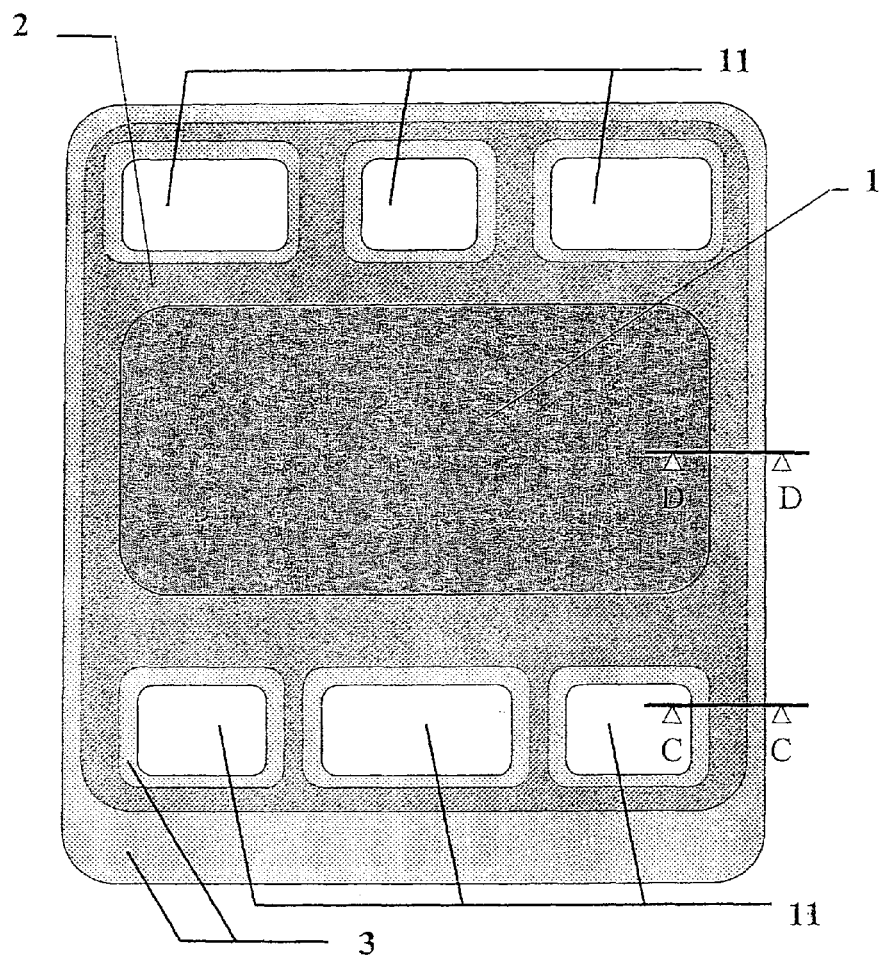
FIG. 4 is a plan view of a MEA device according to an aspect of the present invention.
Figure 6:
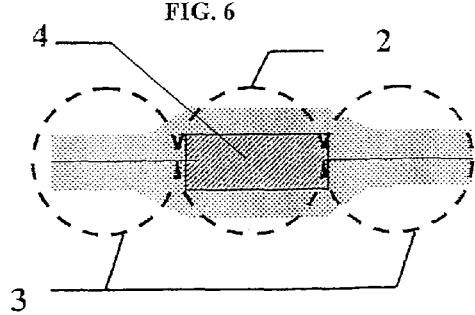
FIG. 6 is a sectional view taken along C-C of FIG. 4.
Figures 1, 7:
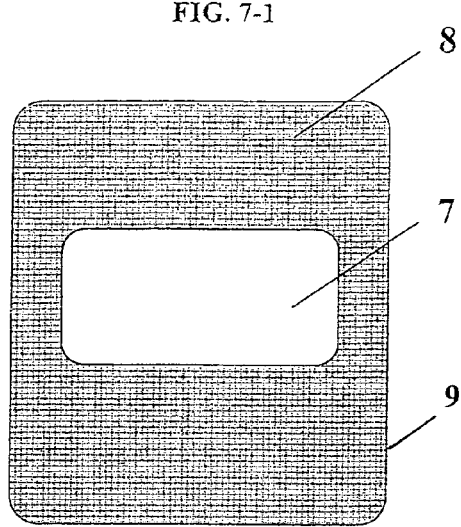
Figures 2, 7:
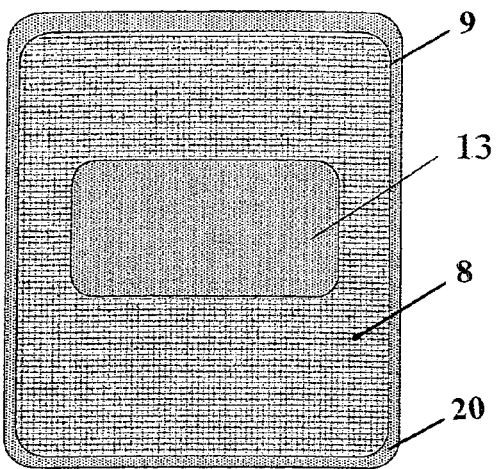
Figures 3, 7:
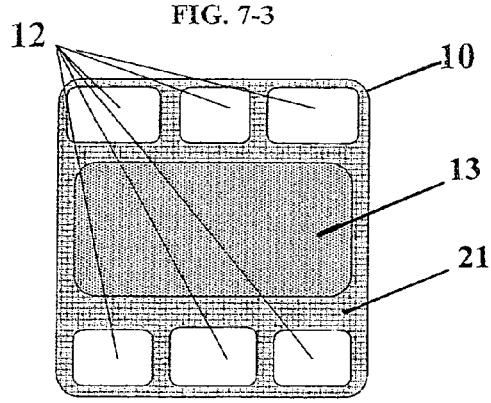
Figures 4, 7:
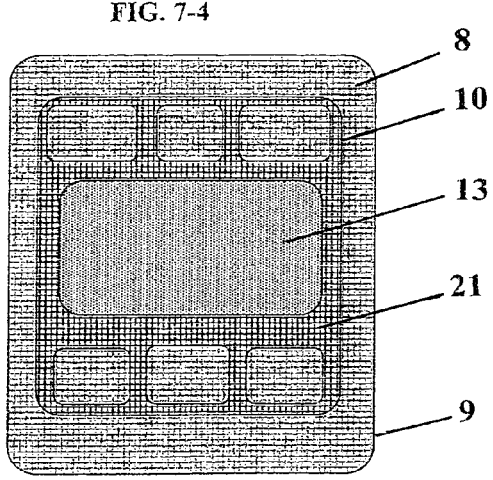
Figures 5, 7:
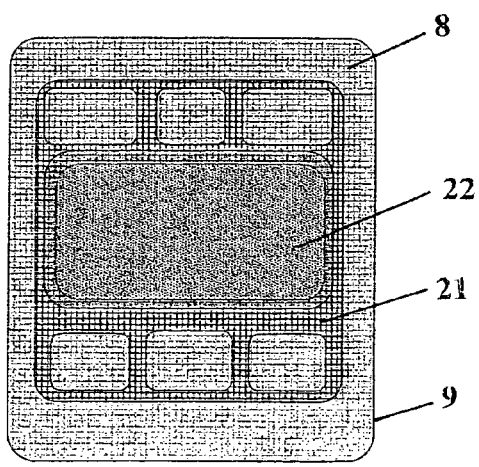
Figures 6, 7:
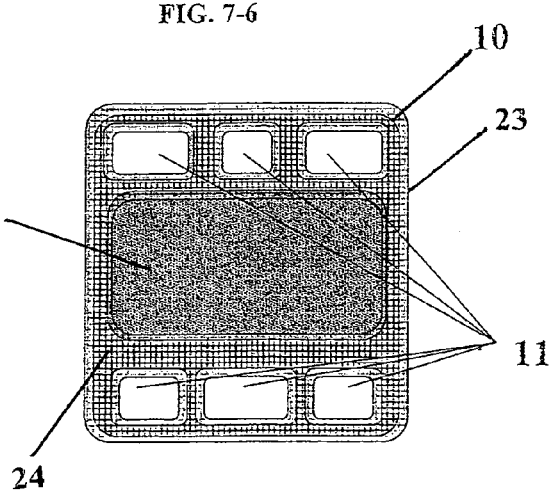

The subgaskets have the following geometrical characteristics:

an empty area, indicated with (7) in FIG. 7-1, inside the subgasket, corresponding to the active area (1) of FIG. 4, delimited by the subgasket edge called herein internal subgasket perimeter (perimeter of (7));

an external perimeter (perimeter (9) of FIG. 7-6 or FIG. 7-1), larger than the ionomeric membrane perimeter (perimeter (10), see FIG. 7-6 or FIG. 7-3);

the perimeter of the openings (11) (see FIG. 7-6) in the subgasket is smaller than that of the corresponding openings (12) (see FIG. 7-3) in the membrane.

The process for preparing the MEA devices of the present invention comprises a step whereby at least two subgasket sheets, having the above characteristics, are used, by applying at least one subgasket sheet on each side of the membrane, the subgasket edges of the two subgasket sheets being of (7) of FIG. 7-1, in contact with each other but not with the membrane except the ones of the internal subgasket perimeter.

The electrocatalytic layer can be applied prior or after the application of the subgaskets.

The Applicant has unexpectedly and surprisingly found that the adhesion between the membrane and the subgaskets is improved, i.e. it is more strong and durable than that obtainable between the catalytic layers and the subgasket (see the Examples).

The application of the subgasket to the MEA can for example be carried out by hot pressing or calendering adhesivized subgaskets or injection molding, etc. For example, when hot pressing is used, the following conditions are preferably applied: pressure between 10 and 40 Kg/cm$^2$, temperature between 100° C. and 170.degree. C., preferably 100° C.-150° C., process time between 2 and 15 minutes. Subgasket sheets can also be used adhesivized on one side with a hot melt adhesive, generally formed of thermoplastic rubbers or hydrocarbon resins. Also in this case the same above hot pressing conditions are used. A preferred hot melt adhesive is EVA (Ethylene Vinyl Acetate).

Alternatively, the subgasket application to the ionomeric membrane can be carried out by hot pressing, under the above conditions, by using hot melt adhesive films, interposed between the membrane and the subgaskets, or by using silicone or acrylic type glues.

According to another embodiment of the application by hot pressing, the subgasket sheets are formed of thermoplastic materials with softening points between 100° C. and 150° C. and are applied to the ionomeric membrane by hot pressing at a temperature for example 1° C.-5° C. lower than the softening point.

For example adhesivized tapes for sensitive pressure application can be applied by calandering.

An embodiment of the process to prepare a 7-layer MEA with subgasket according to the present invention is illustrated in FIG. from 7-1 to 7-6.

FIG. 7-1 is the front view of a subgasket sheet as prepared in the first step of the process according to this embodiment. (7) is the empty area, (8) represents the subgasket and (19) is the external perimeter of the subgasket.

Figure 2:
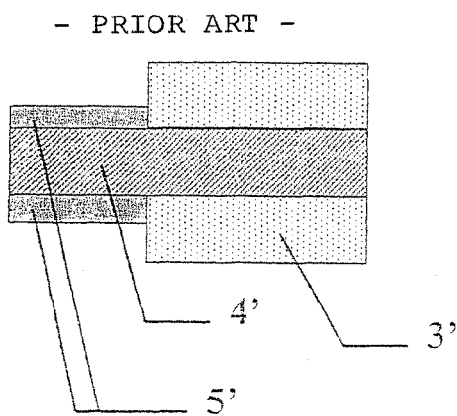
FIG. 2 is a sectional view taken along B-B of FIG. 1.

FIG. 7-2 is the front view of the membrane side with a subgasket applied. (13) indicates the membrane area not covered by the subgasket, (8) is the subgasket of FIG. 7-1, (9) is the external perimeter of the subgasket and (20) is the membrane area external to the perimeter (9). The preparation of this assembly represents the second step of the process according to this embodiment.

FIG. 7-3 is a front view of the assembly on the membrane side with the subgasket of FIG. 7-2 cut in correspondence of a perimeter (10). (10) is equal to or lower than the external perimeter (9) of the subgasket (8) (FIG. 7-1). (12) represent the openings, e.g. having a rectangular section as in the figure, made near the upper and lower edges of the area (13), (21) is the subgasket area obtained after the described cut. This represents the third step of the process according to this embodiment.

FIG. 7-4 represents a plan view of the assembly of FIG. 7-3 with applied a second subgasket of FIG. 7-1 on the same side bearing the subgasket applied in step 2. A third subgasket is likewise applied on the other side of the assembly of FIG. 7-3. This represents the fourth step of the process according to this embodiment.

Figure 5:
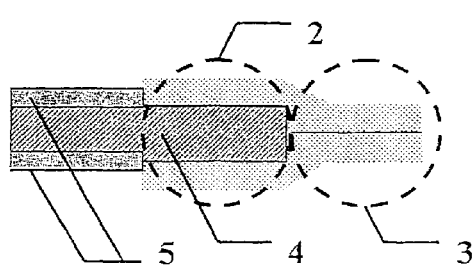
FIG. 5 is a sectional view taken along D-D of FIG. 4.

FIG. 7-5 represents a plan view of the assembly of FIG. 7-4 to which a gas diffusion electrode (22), formed of a catalytic layer, a microdiffusion layer and a gas macrodiffusion layer has been applied in correspondence with the area (13) in FIG. 7-2. A second gas diffusion electrode is likewise applied on the other side of the assembly of FIG. 7-4. All the parts covered by the subgasket (8) are as well shown in FIG. 7-5 for a better understanding of the Figure. This represents the fifth step of the process according to this embodiment.

FIG. 7-6 represents a plan view of the assembly of FIG. 7-5 wherein:
the external perimeter of the assembly has been cut so that perimeter (23) of the subgasket (24) of the assembly is larger than the perimeter (10) of the membrane as shown in FIG. 7-3;
openings (11) have been made having a perimeter lower than that of the openings (12) of FIG. 7-3. This represents the sixth and last step of the process according to this embodiment.

Figures 1, 8:
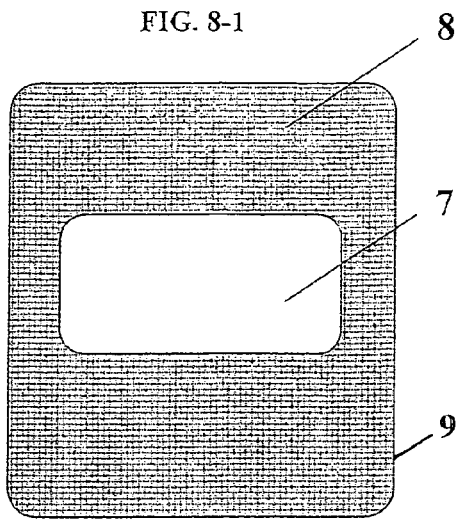
Figures 2, 8:
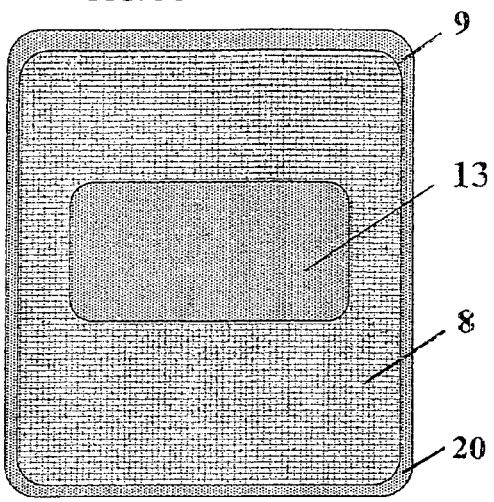
Figures 3, 8:
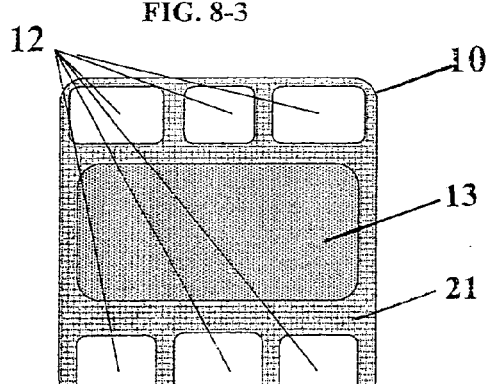
Figures 4, 8:
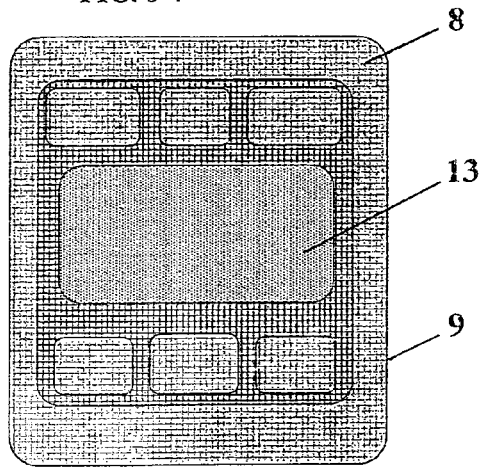
Figures 5, 8:
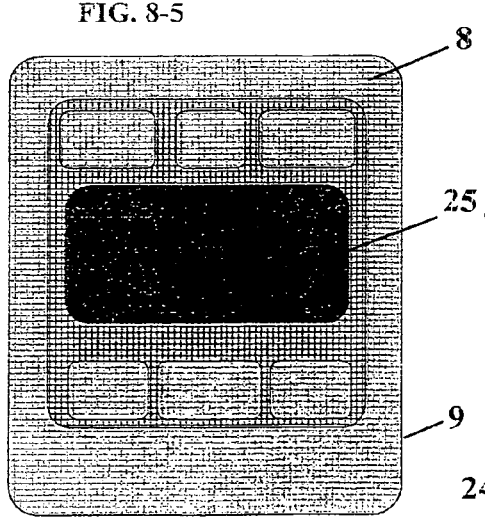
Figures 6, 8:
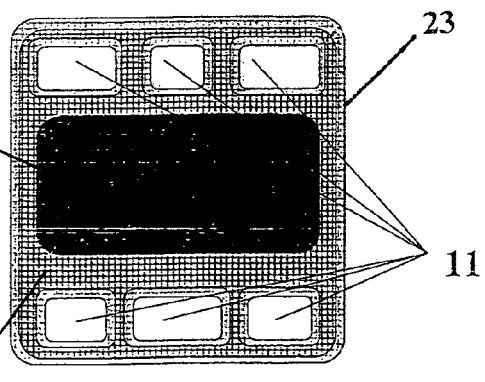
Figures 1, 9:
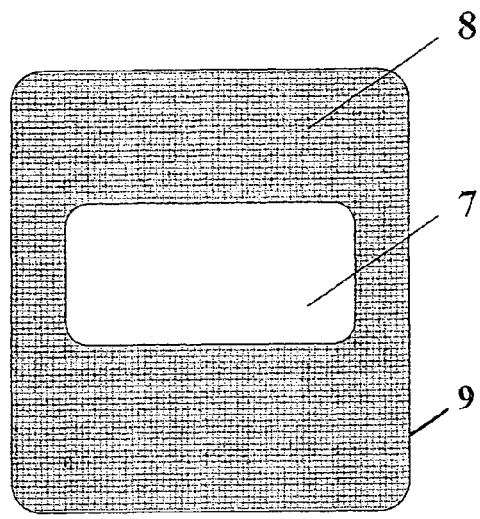
Figures 2, 9:
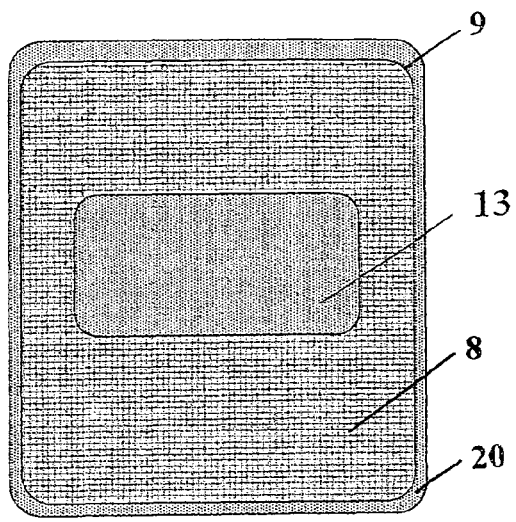
Figures 3, 9:
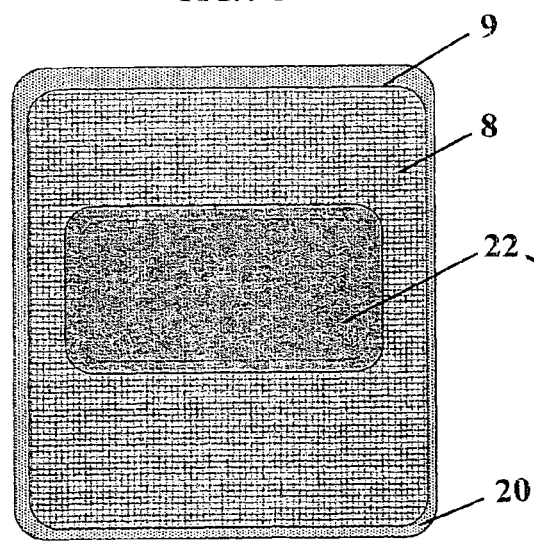
Figures 4, 9:
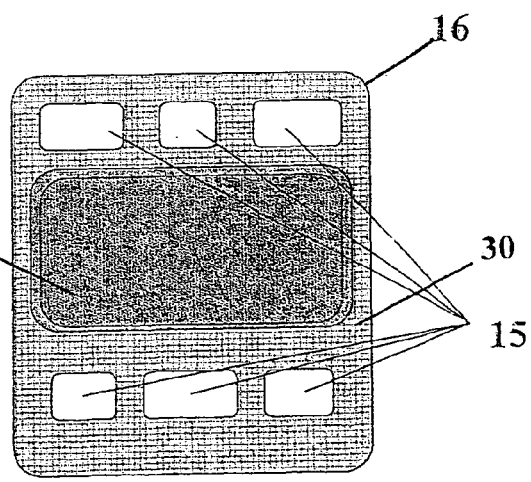

An embodiment of the process to make a 3-layer MEA with subgasket according to the present invention is illustrated in the FIGS. from 8-1 to 8-6, wherein:
FIG. 8-1 corresponds to FIG. 7-1;
FIG. 8-2 corresponds to FIG. 7-2;
FIG. 8-3 corresponds to FIG. 7-3;
FIG. 8-4 corresponds to FIG. 7-4;
FIG. 8-5 corresponds to FIG. 7-5 but with the difference that on the two membrane sides a gas diffusion electrode is not applied but a catalytic layer (25) is applied by DECAL process;
FIG. 8-6 corresponds to FIG. 7-6, taking into account the above difference or the gas diffusion electrode An embodiment of the process to make a 7-layer MEA with subgasket according to the prior art is reported in the FIGS. from 9-1 to 9-4.
FIG. 9-1 corresponds to FIG. 7-1;
FIG. 9-2 corresponds to FIG. 7-2;
FIG. 9-3 represents a plan view of the assembly of FIG. 9-2 to which a gas diffusion electrode (22) has been applied;
FIG. 9-4 represents a plan view of the assembly of FIG. 9-3 wherein:
the external perimeter of the assembly (16) has been cut so that the external perimeter of the subgaskets (130) is equal to the external perimeter of the membrane;
openings (15) with the same area have been made for both the two subgaskets and the membrane.

Figure 10:
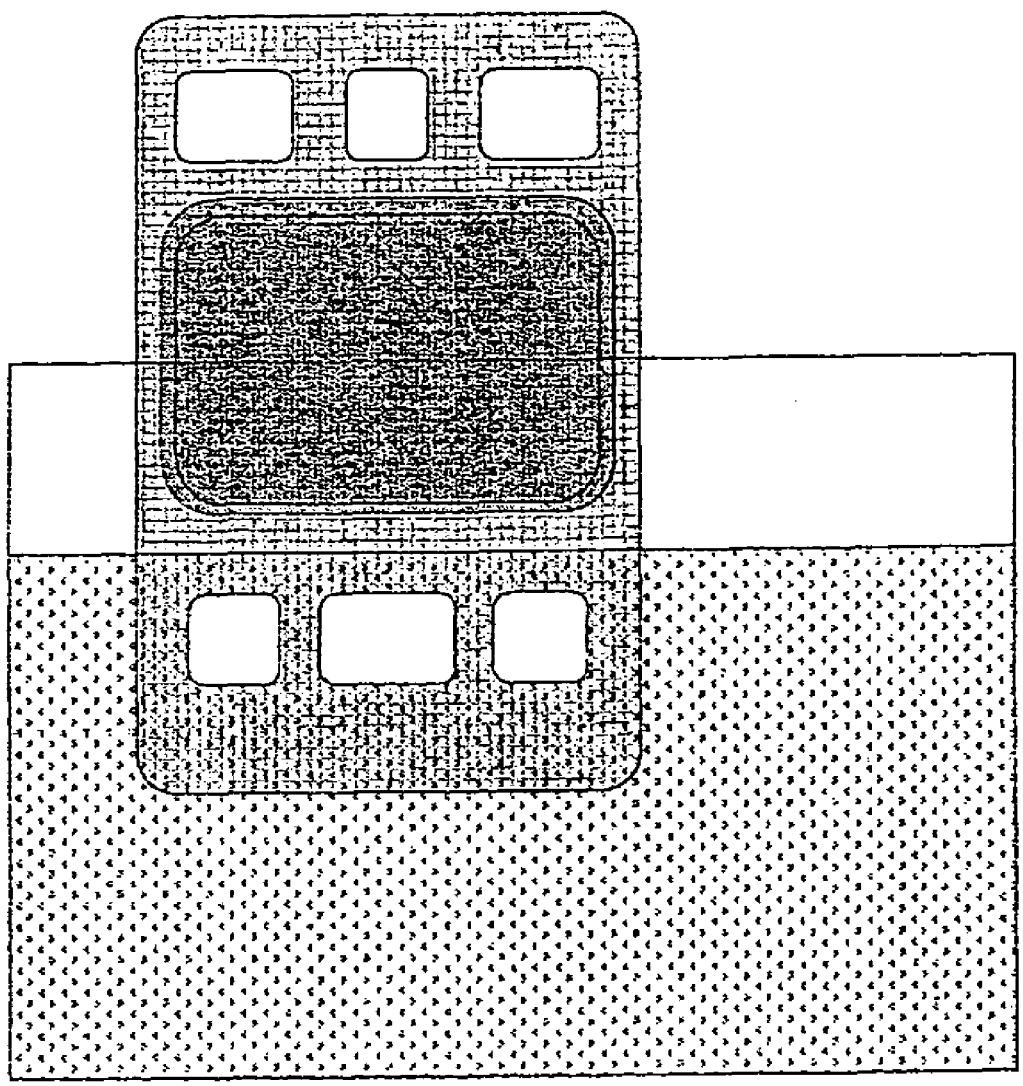
FIG. 10 is the a schematic view an aspect of the present invention.

FIG. 10 represents the scheme of the equipment used in the experiment of pollution-resistance described in Example 8.

The Applicant has unexpectedly and surprisingly found that by using the hot pressing with hot melt adhesive, MEA assemblies more lasting are obtained, even after several cycles in water at temperatures in the range 20° C.-80° C.

The Applicant has unexpectedly and surprisingly found that the MEA of the present invention, by using water having a low purity degree as cooling fluid, maintain substantially the same performances for long operating periods, even of the order of 6 months. This represents an advantage in respect of the MEA of the prior art, the performance of which is negatively affected if water of low purity degree is used as cooling fluid. See the Examples wherein the MEAs of the prior art, within 10 days, show a content of polluting agents such as to compromise the performances in the electrochemical cells. It is indeed well known that the presence of polluting agents negatively affects the electrochemical cell performances. See N-Yoshida et Al., Electrochemical Acta Vol. 43, 24, 3749-3754 (1998), A. Pozio et al., Electrochemical Acta 48 (2003) 1543-1549. Therefore the MEAs of the present invention can be used in electrochemical devices, in particular in fuel cells, with cooling fluids, for example formed of water, even having a lower purity than those used with the MEAs of the prior art. Therefore in the MEAs of the present invention, as cooling fluids, mixtures of water and high boiling solvents, for example water/glycols, can also be used in a wide temperature range, for example from temperatures lower than 0° C. up to temperatures higher than 100° C., for example from −40° C. to 160° C.

The preparation of the ionomers used for preparing the membranes can be carried out with a radical polymerization process in mass, solution, suspension, emulsion. See U.S. Pat. Nos. 3,282,875, 6,639,011, 6,555,639.

The aqueous emulsion or microemulsion polymerization can for example be mentioned. The surfactants usable in these polymerizations are (per)fluorinated surfactants, for example salts (as defined below) of the perfluorooctanoic, perfluorononanoic, perfluorodecanoic acid, or their mixtures, etc., (per)fluoropolyethers with an acid end group (example —COOH, —SO$_3$H), salified with NH$_4^+$ or with alkaline metal cations, the other end group being (per)fluorinated, optionally containing one H or Cl atom. The number average molecular weights of the perfluoropolyether surfactants generally range between 300 and 1,800, preferably between 350 and 750.

The microemulsion polymerization is well known in the art. See U.S. Pat. No. 6,555,639.

In particular the preparation of the ionomers is carried out by using an aqueous emulsion wherein in the reaction medium, as surfactants, those of formula:

$$R_f-X_1^-M^+$$

are used, wherein:

$X_1$ is equal to —COO, —SO$_3$;

M is selected from H, NH$_4$ or an alkaline metal;

$R_f$ represents a (per)fluoropolyether chain, preferably having number average molecular weight between about 300 and about 1,800, preferably from 300 to 750, said (per)fluoropolyether chain comprising repeating units selected from one or more of the following:

a) —(C$_3$F$_6$O)—;
b) —(CF$_2$CF$_2$O)—;
c) —(CFL$_0$O)—, wherein L$_0$=—F, —CF$_3$;
d) —CF$_2$(CF$_2$)$_z$CF$_2$O—, wherein z' is an integer 1 or 2;
e) —CH$_2$CF$_2$CF$_2$O—.

$R_f$ is monofunctional and has a (per)fluorooxyalkyl end group T, for example CF$_3$O—, C$_2$F$_5$O—, C$_3$F$_7$O—; optionally in perfluoroalkyl end groups one fluorine atom can be substituted by one chlorine or hydrogen atom. Examples of these end groups are Cl(C$_3$F$_6$O)—, H(C$_3$F$_6$O)—. The unit a) C$_3$F$_6$O is CF$_2$—CF(CF$_3$)O— or —CF(CF$_3$)CF$_2$O—.

The aqueous emulsion polymerization is well known in the prior art. See U.S. Pat. No. 6,639,011.

In the above formula $R_f$ preferably has one of the following structures:

1) T-(CF$_2$O)$_a$—(CF$_2$CF$_2$O)$_b$—CF$_2$— b, a being integers, with b/a between 0.3 and 10, extremes included, a being an integer different from 0;

2) T-(CF$_2$—(CF$_2$)$_{z'}$—CF$_2$O)$_{b'}$—CF$_2$— b' and z' being integers, wherein z' is an integer equal to 1 or 2;

3) T-(C$_3$F$_6$O)$_r$—(C$_2$F$_4$O)$_b$—(CFL$_0$O)$_t$—CF$_2$— r, b, t being integers, with r/b ranging from 0.5 to 2.0, b being different from zero; (r+b)/t ranges from 10 to 30; t being different from 0, a, b, b', r, t, are integers, their sum is such that $R_f$ has the above values of number average molecular weight; T=—OCF$_3$ or —OCF$_2$Cl.

The compounds wherein $R_f$ has the formula 3) wherein b=0, are still more preferred.

The (per)fluoropolyethers $R_f$ are obtainable with the well known processes in the prior art, see for example the following patents herein incorporated by reference: U.S. Pat. Nos. 3,665,041, 2,242,218, 3,715,378 and EP 239,123. The fluoropolyethers functionalized with hydroxyl termination are for example obtained according to EP 148,482, U.S. Pat. No. 3,810,874. The functional end groups are obtained with the processes indicated in said patents.

Chain transfer agents can be used in the polymerization. For example iodide and/or bromides of alkaline or alkaline-earth metals, according to U.S. Pat. No. 5,173,553. Preferably chain transfer agents containing hydrogen as hydrocarbons, alcohols, in particular ethyl acetate and ethane are used.

The polymerization initiators used in the process of the present invention are preferably radical inorganic initiators as, for example, ammonium and/or potassium and/or sodium persulphate, optionally in combination with ferrous, cuprous or silver salts. The procedures of the initiator feeding into the polymerization reactor can be in a continuous way or by a single addition at the beginning of the polymerization.

The polymerization reaction is generally carried out at temperatures in the range 25° C.-70° C., preferably 50° C.-60° C., under pressure up to 30 bar (3 MPa), preferably higher than 8 bar (0.8 MPa).

Monomer (B) and optionally (B') is fed into the polymerization reactor in a continuous way or by steps.

After the polymerization is completed, the ionomer is isolated by conventional methods as the coagulation by addition of electrolytes or by freezing.

A further object of the present invention is represented by electrochemical devices comprising the assemblies of the present invention, in particular fuel cells.

A further object of the present invention is the use of the assemblies of the invention in electrochemical devices, in particular in fuel cells.

The following Examples illustrate with non limitative purposes the present invention.

EXAMPLES

Example 1

Preparation of a 7-Layer MEA With Subgasket

An extruded ionomeric membrane Hyflon® Ion (Solvay Solexis), formed of a TFE/CF$_2$=CF—O(CF$_2$)$_2$—SO$_3$H copolymer, having a thickness of 50 micrometres, is used.

As subgasket, PET having a 32 micron thickness treated on one side with Ethylene Vinyl Acetate (EVA) (Pertex Prima S.r.l., Milano) is used.

Three subgasket sheets are cut from a PET film according to a shape, see FIG. 7-1, having the following geometry:
 a central empty area (7), delimited by a rectangular perimeter with blunted angles, and corresponding to the MEA active area;
 an external perimeter (9) larger than that of the final MEA represented in FIG. 7-6.

The side of the subgasket treated with the EVA dispersion is put into contact with the membrane. FIG. 7-2 is a front view of the assembly membrane+subgasket, described hereinafter, from the membrane side on which the subgasket is applied. In case of the present example, a portion (20) of the membrane is external to the subgasket perimeter (9), as illustrated in FIG. 7.2.

The subgasket is adhered to the membrane by hot pressing, by using a heated press model COLLIN® Laboratory platen press Type 300M, under the following conditions:
 time: 5 minutes;
 temperature: 100° C.;
 pressure: 10 Kg/cm$^2$.

After the hot pressing step cooling from 100° C. to 30° C. is applied following a linear temperature reduction in a total time of 5 minutes, maintaining the same pressure used in hot pressing. At the end a first assembly is obtained, formed of the membrane having a subgasket attached to one of the two surfaces, see FIG. 7-2.

The first assembly is punched according to the shape represented in FIG. 7.3, which is a front view of the first assembly seen from the subgasket side, by making holes of rectangular section (12).

A second assembly is then prepared by adhering a subgasket sheet shown in FIG. 7-1 on each side of the assembly of FIG. 7-3. The adhesion is obtained by hot pressing under the same conditions used for preparing the first assembly. The subgasket sheet have sizes higher than those of the first assembly.

The following cooling step is carried out under the same conditions described for the preparation of the first assembly. A second assembly is obtained represented in FIG. 7-4.

On each side of the second assembly, in correspondence with the active area, a gas diffusion electrode LT250EW (E-TEK) is applied. These gas diffusion electrodes, containing a gas macro-diffusion layer and a gas microdiffusion layer, are directly supplied with a surface which has been treated with 0.5 mg/cm$^2$ of Pt supported on carbon and then with 0.5-0.7 mg/cm$^2$ of Nafion® perfluorosulfonate polymer. The treated surface is the one contacted with each of the membrane surfaces.

The gas diffusion electrodes are attached by using in the hot pressing step the following conditions:
time: 5 minutes;
temperature: 150° C.;
pressure: 10 Kg/cm$^2$.

The subsequent cooling is carried out by using a linear gradient from 150° C. to 30° C. for a time of 5 minutes maintaining the pressure of the hot pressing step.

In the present Example the gas diffusion electrode area is greater than the active area which is coated.

FIG. 7-5 is a plan view of the second assembly with the gas diffusion electrodes applied on the active area. The Figure shows that the perimeter of the gas diffusion electrode is greater than that of the active area.

The second assembly completed with the gas diffusion electrodes is punched in correspondence of the holes (11) and the external perimeter (23), so as to obtain the MEA illustrated in FIG. 7-6 as plan view.

With respect to the first assembly, represented in FIG. 7-3, the second assembly completed with the gas diffusion electrodes illustrated in FIG. 7-6 shows the following differences:
the rectangular section holes (11) have a lower perimeter compared with the holes (12);
the external perimeter (23) of the final assembly is greater than that (10) of the first assembly.

Example 2

Preparation of a 3-Layer MEA With Subgasket

The same kind of membrane and subgasket as in Example 1 is used. The first assembly is prepared by applying a subgasket sheet (FIG. 8-1) to each membrane side, by using for the assembling the conditions indicated in the Example 1. The obtained assembly is illustrated in the plan view of FIG. 8-2.

The first assembly is then punched near the edges, by making rectangular section holes as shown in FIG. 8.3, which is a plan view of the first assembly from the subgasket side, to obtain the openings (12).

The second assembly is prepared, see FIG. 8-4 which is a plan view of the second assembly, by adhering on each side of the first assembly a subgasket sheet prepared as above (FIG. 8-1). The adhesion is obtained by hot pressing under the same conditions described in Example 1, to obtain the second assembly. FIG. 8-4 shows that the two subgasket sheets have sizes such as to enclose the first assembly.

On each side of the second assembly, in correspondence with the active area, a catalytic layer formed of a 1:1 mixture by weight of platinum supported on carbon and of ionomer Hyflon® Ion (Solvay Solexis) is applied by "DECAL" process at a temperature of about 150° C. and at a pressure of about 20 bar (U.S. Pat. No. 5,211,984 and 5,234,777). In this case the perimeter of the catalytic area (25), or active area, is coinciding with the perimeter of the empty area (7) as shown in FIG. 8-5.

The second assembly is lastly punched, obtaining the MEA illustrated as plan view in FIG. 8-6.

The MEA shows the following differences with respect to the first asembly (FIG. 8-3):
the rectangular section holes (11) have a lower perimeter than the holes (12);
the external perimeter (23) is larger than that (10) of the first assembly.

Example 3 (Comparative)

Preparation of a 7-Layer MEA With Subgasket According to the Prior Art.

The same kind of membrane and subgasket of the Example 1 is used.

Two subgasket sheets are cut, see FIG. 9-1, with the procedure described in Example 1. One subgasket is applied on each membrane side.

As in Example 1, the application is carried out so that there is an area (20) of membrane external to the perimeter (9) of the subgasket as illustrated in FIG. 9-2, which is a plan view of the assembly formed of the membrane with two subgaskets applied one on each side. The side of the subgasket treated with the EVA dispersion is the one contacted with the membrane.

The assembling is carried out by contacting the membrane with the subgaskets by hot pressing and cooling as described in Example 1.

On each side of the assembly, in correspondence with the active area a gas diffusion electrode LT250EW (E-TEK) is applied, comprising a gas macrodiffusion layer and a gas microdiffusion layer. The application is carried out as described in the Example 1.

FIG. 9-3 is a plan view of the assembly with the gas diffusion electrodes (22) applied on the active area. The Figure shows that the perimeter of (22) is greater than that of the active area.

The assembly is then punched obtaining the MEA which is reported as plan view in FIG. 9-4.

By carrying out a 7-layer MEA with subgasket according to the prior art, an edge profile is obtained as reported in FIG. 2 and FIG. 3. Therefore the subgaskets do not cover the edges of the membrane.

Example 4 (Comparative)

Preparation of an Assembly With Subgasket Wherein the Catalytic Area is Coextensive to That of the Ionomeric Membrane and the Subgasket Coats the Assembly Surfaces An extruded ionomeric membrane Hyflon® Ion (Solvay Solexis) is used, formed of a TFE/CF$_2$=CF—O(CF$_2$)$_2$—SO$_3$H copolymer, having a thickness of 100 micrometres and 50×100 mm sizes. As subgasket, PET is used, having a 125 micron thickness treated on one side with Ethylene Vinyl Acetate (EVA) (Perfex by PRIMA s.r.l., Milano).

The catalytic ink is prepared from a 1:1 mixture by weight of platinum supported on carbon (TEC10V50E by TANAKA, GP) with Hyflon® Ion ionomer (Solvay Solexis) in hydroalcoholic solution. By using a stratifying knife (BRAIVE) a thickness of 100 micrometres of catalytic ink on a rectangular surface having 50×100 mm sides is spread on a non porous PTFE support.

The catalytic ink is then dried in a ventilated oven for 30 minutes at 65° C. The process is likewise repeated on a second PTFE support.

By using the procedure of the "DECAL" process (U.S. Pat. Nos. 5,211,984 and 5,234,777) the two catalytic layers are transferred from the PTFE support to the ionomeric membrane. The transfer process is carried out under the following conditions:
  temperature: 150° C.;
  pressure: 272 N/cm$^2$;
  time: 300 seconds.

A cooling step is then effected by applying a temperature gradient of (15° C.)/(minute) for 5 minutes under unchanged pressure.

The two PTFE sheets are then removed. It is noted that the catalytic layer is wholly attached to the ionomeric membrane. An assembly of 50×100 mm sizes is thus obtained, formed of an ionomeric membrane entirely coated by an electrocatalytic layer on both sides.

On both sides of the so obtained assembly a subgasket sheet having 50×120 mm sizes is applied, with the side adhesivized with EVA placed on the internal part, by using the following hot pressing conditions only on the overlapping area among subgasket-assembly-subgasket, so that each subgasket, after the adhesion, has a free edge (not attached to the membrane and to the other subgasket) having 50×20 mm sizes:
  temperature: 100° C.;
  pressure: 98 N/cm$^2$;
  time: 300 seconds.

To the hot pressing step a linear gradient cooling between 100° C. and 300° C. follows, carried out in a total time of 10 minutes.

Example 5

Preparation of Assembly Made of a Membrane Having One Surface Coated by Subgasket By using the same procedure described in the Example 4, a second assembly is prepared formed of a piece of extruded ionomeric membrane Hyflon® Ion (Solvay Solexis), made of a TFE/CF$_2$=CF—O(CF$_2$)$_2$—SO$_3$H copolymer, having a 100 micrometres thickness and 50×100 mm sizes and two subgasket pieces of 50×120 mm sizes.

This Example substantially represents the second step of the process of the present invention.

Example 6

Peeling Tests on the Assemblies Prepared in the Example 4 (Comparative) and in the Example 5

A dynamometer ZP/Z2 by IMADA (Roma) is used. The sizes of the piece to be tested were of 50×100 mm.

It is found that the assembly prepared according to the Example 5 resists a tensile stress 8 times higher than that of the assembly prepared according to the Example 4 (comparative), before the delamination of the subgasket from the membrane. This shows that the direct adhesion of the subgasket to the membrane is stronger than when between the subgasket and the membrane a catalytic layer is interposed.

Example 7

Peeling Tests on the Assemblies Prepared in the Example 4 (Comparative) and in the Example 5 After Repeated Cooling/Heating Cycles Between 200° C. and 800° C. in Water.

Assemblies prepared according to the Examples 4 (comparative) and 5 are dipped into water and subjected to 20 cooling/heating cycles between 200° C. and 800° C.

It is found that the assembly prepared according to the Example 5 resists a tensile stress 15 times higher than that of the assembly prepared according to the Example 4 (comparative), before the delamination of one of the subgasket from the membrane.

The same comments as in Example 6 can be repeated.

Example 8

Evaluation of the Resistance to Pollution of the 7-Layer MEA With Subgasket of Example 1 and of the MEA of Example 3 (Comparative).

The device used is schematized in FIG. 10. From a MEA specimen according to the present invention (Example 1) the active area is cut along the edges and, after the gas diffusion layers have been removed, the potassium analysis is carried out by fluorescence with spectrophotometer XRF PW 2400 (Philips Analytical). By determining the height of the fluorescence peak of the potassium K$\alpha$ at the wave length of 3.742 A° the cation content is estimated. This determination corresponds to the untreated reference specimen.

Another specimen of the 7-layer MEA according to the present invention (Example 1) is partially immersed in a solution having concentration 1000 ppm of KCl, so that the active area does not come into contact with the liquid. The experiment lasts 100 hours. At the end of the experiment, after having removed the gas diffusion layers, the active area is cut and analyzed for the potassium ion as above.

The above experiment is repeated by using a 7-layer MEA prepared according to the Example 3 (comparative).

The analysis of the potassium ion in the specimens has given the following results:
  the fluorescence peak height (wavelength 3742 Å given by the MEA of Example 1 was undistinguishable from that of the untreated reference specimen;
  the fluorescence peak height given by the active area of the MEA of Example 3 (comparative) was 22 times higher than that of the untreated reference specimen.

The obtained results show that the MEAs of the present invention remain unchanged after prolonged contact times with water having a low purity degree, i.e. in this case a KCl dilute solution. The prior art MEAs are instead polluted by the used low purity water. Therefore the MEAs of the present invention have a long service life independently of the purity of the used cooling fluid. This represents an advantage in the confront of the MEAs of the prior art.

The invention claimed is:
1. Assemblies or a Membrane Electrode Assembly (MEA) device comprising an ionomeric membrane having edges, said membrane comprising openings for the reaction and cooling fluids and, on each side two electrocatalytic layers, wherein:
  the area of each of the two electrocatalytic layers is lower than that of the ionomeric membrane; and
  on each of the two sides of the ionomeric membrane there is at least one subgasket, applied on the MEA non catalyzed area;

wherein the edges of the ionomeric membrane and the edges of the openings in said ionomeric membrane are enclosed among said subgaskets.

2. Assemblies according to claim 1, wherein two or more subgaskets are present on one or both sides of the ionomeric membrane.

3. Assemblies according to claim 1, comprising:
an active area formed of the two electrocatalytic layers positioned on each side of the ionomeric membrane, wherein the area of the electrocatalytic layers is lower than that of the ionomeric membrane; the ionomeric membrane and the electrocatalytic layers form a 3-layer MEA; and the active area is not coated by subgasket;
an area of the ionomeric membrane surface that is coated by the subgasket; and
an area where the at least one subgasket overlaps a second subqasket, wherein the subgaskets enclose the ionomeric membrane edges.

4. Assemblies according to claim 3, comprising on each side of the two electrocatalytic layers, not in contact with the ionomeric membrane, a gas microdiffusion layer.

5. Assemblies according to claim 4, comprising on each side of the two microdiffusion layers, not in contact with the electrocatalytic layer, a gas macrodiffusion layer.

6. Assemblies according to claim 1, wherein the ionomeric membrane and the electrocatalytic layers are obtainable by using (per) fluorinated ionomers with sulphonic groups in —$SO_3H$ acid or salified form, having equivalent weight from 380 g/eq to 1,600 g/eq.

7. Assemblies according to claim 6, wherein the (per) fluorinated ionomers with sulphonic groups in —$SO_3H$ acid or salified form, have equivalent weight from 500 to 1,200 g/eq.

8. Assemblies according to claim 6, wherein the (per) fluorinated ionomers with sulphonic groups in —$SO_3H$ acid or salified form, having equivalent weight from 750-950 g/eq.

9. Assemblies according to claim 6, wherein the ionomers comprise the following units:
(A) monomeric units deriving from one or more fluorinated monomers containing at least one ethylenic unsaturation;
(B) fluorinated monomeric units containing —$SO_2F$ sulphonyl groups in amounts such that the ionomer has the equivalent weight in the above range, transformation of the —$SO_2F$ groups in acid —$SO_3H$ or salified form.

10. Assemblies according to claim 9, wherein the ionomers are homopolymers formed of monomeric units (B), the ionomers containing the sulphonic groups in acid —$SO_3H$ or salified form being obtainable by hydrolysis of the —$SO_2F$ groups.

11. Assemblies according to claim 9, wherein the fluorinated monomers (A) are selected from the following:
vinylydene fluoride (VDF);
$C_2$-$C_8$ perfluoroolefins;
$C_2$-$C_8$ chloro- and/or bromo- and/or iodo-fluoroolefins as chlorotrifluoroethylene (CTFE) and bromotrifluoroethylene;
$CF_2$=$CFOR_{f1}$ (per)fluoroalckylvinylethers (PAVE), wherein $Rf_1$ is a $C_1$-$C_6$ (per) fluoroalkyl;
$CF_2$=CFOX perfluoro-oxyalkylvinylethers, wherein X is a $C_1$-$C_{12}$ perfluoro-oxyalkyl having one or more ether groups;
fluorovinylethers (MOVE) of general formula $CFX_{AI}$=$CX_{AI}OCF_2OR_{AI}$ (A-I), wherein $R_{AI}$ is a linear, branched $C_1$-$C_6$ (per)fluoroalkyl group or $C_5$-$C_6$ cyclic, or a linear or branched $C_1$-$C_6$ (per)fluoro-oxyalkyl group containing from one to three oxygen atoms; when $R_{AI}$ is fluoroalkyl or fluorooxyalkyl as above it optionally contains from 1 to 2 atoms, equal or different, selected from the following: H, Cl, Br, I; $X_{AI}$=F, H.

12. Assemblies according to claim 10, wherein the fluorovinylethers are selected from: $CF_2$=$CFOCF_2OCF_2OCF_3$ (MOVE1), 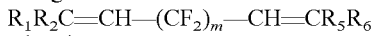 (MOVE2), or $CF_2$=$CFOCF_2OCF_3$ (MOVE3).

13. Assemblies according to claim 10, wherein $Rf_1$ is trifluoromethyl, bromodifluoromethyl, or pentafluoropropyl.

14. Assemblies according to claim 10, wherein X is perfluoro-2-proxpoxy-propyl.

15. Assemblies according to claim 6, wherein, alternatively to monomers (B), for preparing the ionomers having equivalent weight as reported for sulphonic ionomers, monomers (B') are used containing precursor groups which are transformed by hydrolysis into —COOH acid groups, and optionally in their corresponding salts, optionally monomers (B') are used in admixture with monomers (B).

16. Assemblies according to claim 1, wherein the ionomers contain from 0.01% to 2% by moles of monomeric units deriving from a bis-olefin of formula:
$R_1R_2C$=CH—$(CF_2)_m$—CH=$CR_5R_6$
wherein:
m=2-10;
$R_1$, $R_2$, $R_5$, $R_6$, equal to or different from each other, are H or $C_1$-$C_5$ alkyl groups.

17. Assemblies according to claim 1, wherein the ionomeric membranes and the electrocatalytic layers contain perfluorinated ionomers obtainable from ionomers comprising:
monomeric units deriving from TFE;
monomeric units deriving from $CF_2$=CF—O—$CF_2CF_2SO_2F$.

18. Assemblies according to claim 6, wherein the ionomers are crosslinked or crosslinkable.

19. Assemblies according to claim 1, wherein the electrocatalytic layers comprise an ionomer and a catalyst, said catalyst being finely dispersed and optionally supported on carbon powder.

20. Assemblies according to claim 19, wherein the ratio by weight between catalyst and ionomer in each of the two electrocatalytic layers ranges from 0.5 to 4.

21. Assemblies according to claim 19, wherein the ratio mg of metal catalyst/$cm^2$ of electrocatalytic layer ranges from 0.01 to 2.

22. Assemblies according to claim 1, wherein the subgaskets can be thermoplastics or elastomeric polymers, hydrogenated or fluorinated.

23. Assemblies according to claim 1, comprising:
an empty area inside the subgasket corresponding to an active area delimited by a perimeter of the empty area or an internal perimeter of the subgasket;
an external perimeter larger than that of the ionomeric membrane; and
openings in the subgasket and in the ionomeric membrane, wherein a perimeter of the openings in the subgasket is lower than that of the openings in the ionomeric membrane.

24. A process for preparing the assemblies according to claim 1, comprising a step whereby at least two subgaskets are used, by applying at least one subgasket sheet on each side of the ionomeric membrane, the subgasket edges of the two subgasket sheets being in contact with each other and not with the ionomeric membrane except the ones of the internal subgasket perimeter.

25. A process for preparing MEA devices according to claim 24, wherein the electrocatalytic layer is applied prior or after the application of the subgasket.

26. A process according to claim 24, wherein the application of the subgasket to the MEA is carried out by hot pressing, or calendaring adhesivized subgaskets or injection molding.

27. A process according to claim 26, wherein the subgasket application to the MEA is carried out by hot pressing by using adhesivized subgaskets on one side with a holt melt adhesive.

28. Electrochemical devices comprising the assemblies according to claim 1.

29. Fuel cells comprising the assemblies according to claim 1.

* * * * *